United States Patent Office 3,324,632
Patented June 13, 1967

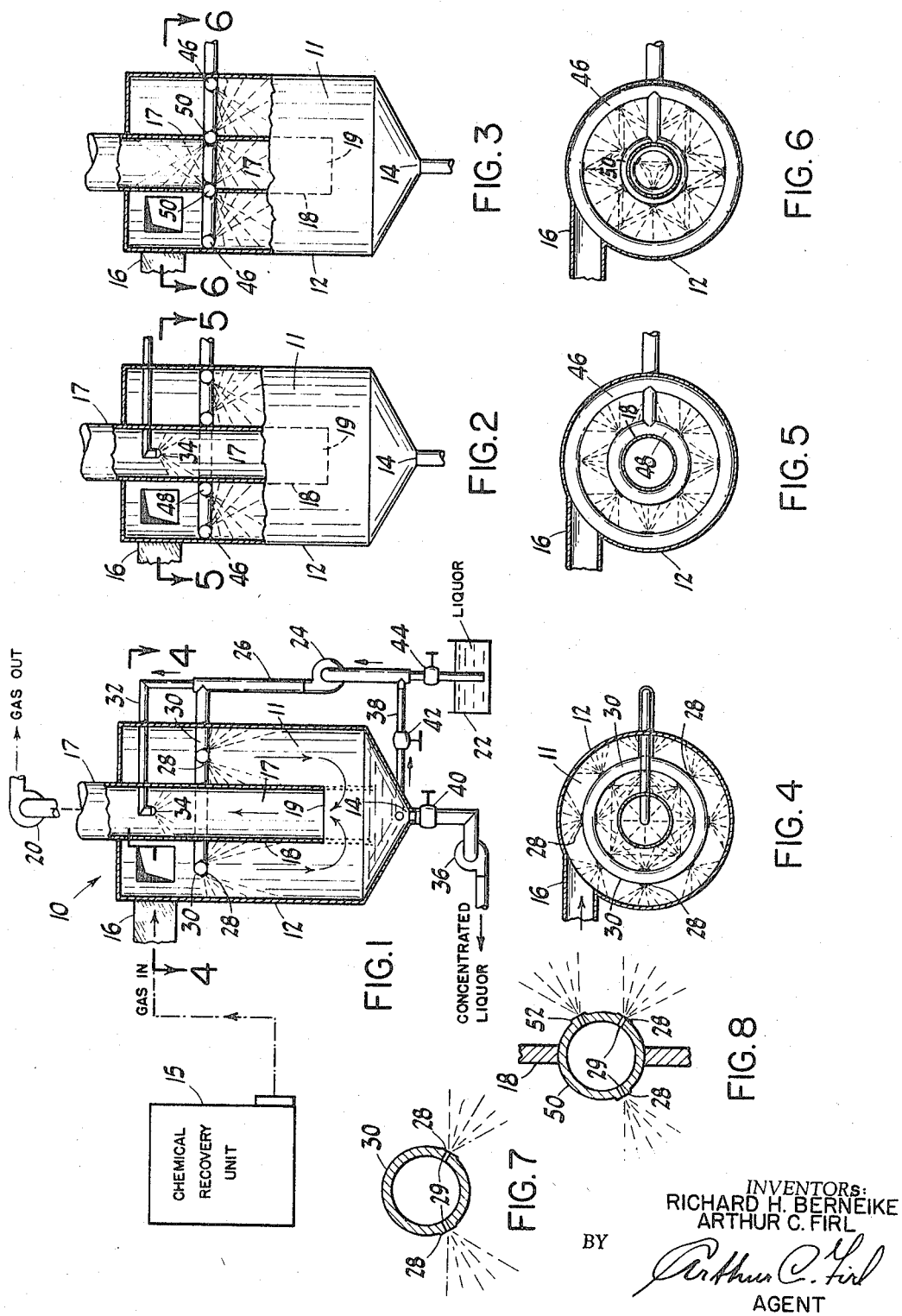

3,324,632
APPARATUS FOR CONCENTRATING RESIDUAL PULP LIQUOR BY DIRECT CONTACT WITH FLUE GASES
Richard H. Berneike, West Simsbury, and Arthur C. Firl, Bloomfield, Conn., assignors to Combustion Engineering, Inc., Windsor, Conn., a corporation of Delaware
Filed Dec. 7, 1965, Ser. No. 512,149
1 Claim. (Cl. 55—236)

The invention relates to apparatus for recovery of chemicals and heat from the flue gases discharged from a chemical recovery boiler in which a pulp residual liquor is burned. More particularly, the invention relates to a cyclone evaporator for the concentration of residual liquor by direct contact with the chemical laden hot flue gases.

Heretofore, contact apparatus such as evaporators of the mechanical type had been employed to expose the unconcentrated liquor to the hot flue gases to cause evaporation of water contained in the liquor, and at the same time to dissolve the chemical ash particles suspended in the flue gases. One such apparatus, for example, is equipped with rotating drums provided with contact surfaces which alternately pass through a pool of unconcentrated liquor and a stream of hot combustion gases. Mechanical difficulties arise in the operation of such mechanical evaporators and cause costly shutdowns of the plant. These shutdowns, together with high maintenance costs and cost of power required for driving the evaporator, are factors which reduce the overall efficiency of the plant.

It is accordingly a main object of the invention to provide an evaporator for concentrating residual liquor and absorbing heat and chemical ash from the flue gases of a chemical recovery boiler, which evaporator is of the cyclonic type not requiring moving parts or driving power to operate.

It is another object of the invention to provide an evaporator which is not likely to become clogged or fouled and require cleaning and shutdown for that purpose.

Other objects and advantages of the invention will become apparent from the following description of an illustrative embodiment thereof when taken in conjunction with the accompanying drawings wherein:

FIG. 1 is a diagrammatic representation of the improved cyclone evaporator herein disclosed in the form of an elevational cross section;

FIGS. 2 and 3 are elevational cross sections through evaporators similar to that shown in FIG. 1, however, illustrating different liquor spraying nozzle arrangements;

FIGS. 4, 5 and 6 are sectional plan views of the evaporators shown in FIGS. 1, 2 and 3, respectively, when taken on lines 4—4, 5—5 and 6—6 of the respective FIGS. 1, 2 and 3; and FIGS. 7 and 8 are enlarged cross sections through the liquor supply pipes and nozzles shown in FIGS. 1 and 3, respectively.

Referring now to the drawings wherein like reference characters are used throughout to designate like elements, the preferred embodiment of the invention depicted therein includes a cyclone evaporator generally designated as 10 which comprises a cyclone chamber 11 defined by a cylindrical wall 12 having a central outlet 14 for discharging the concentrated liquor.

Referring now more specifically to FIGS. 1 and 4, hot flue gases carrying chemical ash and received from chemical recovery unit 15 enter the upper portion of chamber 11 by way of a duct 16 that is tangentially connected to cylindrical wall 12 as shown in FIG. 4. The gases in passing through the cyclone chamber 11 follow a spiral downwardly directed path and after reversing direction leave the chamber by way of a centrally located gas outlet duct 17 having a wall 18 projecting down into chamber 11 from the upper end thereof. An induced draft fan 20 is provided to furnish the suction necessary for drawing the combustion gases through cyclone evaporator 10 and for delivering them to a stack, not shown.

Unconcentrated pulp residual liquor taken from a supply source 22 by way of pump 24 and conduit 26 is discharged under pressure into chamber 11 through nozzles 28. These nozzles as shown in FIG. 7 may be in the form of bores 29 provided in a circular supply pipe 30 which is located intermediate the chamber wall 12 and the gas outlet duct 17, and preferably concentric therewith. A branch conduit 32 also delivers liquor to a nozzle 34 located in the upper part of duct 17. Nozzles 28 and 34 are organized to issue jets of unconcentrated liquor in a downwardly slanting direction against the inner surface of chamber wall 12 and the outer and inner surface of gas outlet duct wall 18.

In operation, the unconcentrated liquor that is sprayed against walls 12 and 18 forms a thin film and exposes a large surface to the hot gases sweeping these walls. A substantial portion of the water contained in the liquor is thereby evaporated. In addition the chemical ash particles carried along in the sweeping hot gases are thrown against the inner surface of chamber wall 12 by centrifugal force and are largely absorbed by the liquor flowing downwardly along this surface toward the concentrated liquor outlet 14. Additional evaporation of the water in the liquor, and absorption of chemicals from the gases takes place when the gases pass through the screen of liquor dripping from the lower edge 19 of gas outlet duct 17, which is spaced from the bottom of chamber 11. The liquor concentrated in this manner by evaporation and by absorption of ash particles may be collected in the lower part of chamber 11 as shown in FIG. 1, or in a separate container (not shown), from where it is delivered by a pump 36 to a point of use.

In addition, in accordance with the invention a recirculating conduit 38 is provided from a point downstream of wall 12 in the liquor flow sense to the suction side of pump 24, where the recirculated liquor joins the liquor coming from supply tank 22. Valves 40, 42 and 44 may be furnished to control the quantity of liquor being recirculated and that being drawn from source 22. By recirculating liquor in this manner the degree of concentration of the liquor can be controlled as desired.

FIGS. 2 and 5 show a cyclone evaporator similar to that of FIGS. 1 and 4, however, with the spray nozzles thereof being arranged in a different manner. Thus, in FIGS. 2 and 5, two circular liquor supply conduits 46 and 48 are provided, one conduit 46 being arranged close to chamber wall 12, and the other 48 being arranged close to the gas outlet duct wall 18. The advantage of this design over that shown in FIGS. 1 and 4 lies in the fact that a larger area is covered by each nozzle spray for a given spray angle, because of the larger distance between spray nozzle and spray area.

FIGS. 3 and 6 disclose a cyclone evaporator similar to that illustrated in FIGS. 2 and 5, with the following distinctions. Instead of providing a separate nozzle 34 in the gas outlet duct 17 as shown in FIGS. 1 and 2, a circular supply conduit 50 is organized integrally with duct wall 18 as shown in FIG. 8, for spraying unconcentrated liquor against the inner surface of chamber wall 12 and also against the inner surface of duct wall 18. Furthermore, in addition to nozzles 28, nozzles 52 are provided which are organized for directing jets of liquor upwardly in a slanting direction against the inner surface of gas outlet duct wall 18. In this manner substantially all the available heating surface of the gas outlet duct can be covered with the liquor spray in a simple and most effective manner.

While we have illustrated and described several embodiments of our invention, it is to be understood that such are merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

A gas and liquor contact apparatus for the concentration of pulp residual liquor containing chemical solids in solution and suspension, comprising a cylindrical wall defining a chamber having concentrated liquor outlet means in the lower part thereof, a tangentially arranged gas inlet positioned in the upper portion of said cylindrical wall for introduction of hot gases into said chamber, a centrally located gas outlet duct having a wall projecting downwardly from the upper end of said chamber into the lower part thereof for receiving said hot gases following a spiral path along said cylindrical wall from said tangential inlet to said central outlet duct, the lower end of said duct wall being in open communication with the gas space inside said chamber, the improvement which comprises in combination a plurality of first nozzles located adjacent the inner surface of said chamber wall and organized for spraying unconcentrated liquor against the outer surface of said duct wall, a plurality of second nozzles located adjacent the outer surface of said duct wall and organized for spraying unconcentrated liquor against the inner surface of said chamber wall, a plurality of third nozzles located adjacent the inner surface of said duct wall and organized for spraying unconcentrated liquor against the opposing portion of said duct wall, and pipe means for conducting unconcentrated liquor to said plurality of first, second, and third nozzles, said second and said third pluralities of nozzles having a common supply conduit forming a circular portion of said gas outlet duct wall.

References Cited

UNITED STATES PATENTS

| | | | |
|---|---|---|---|
| 585,604 | 6/1897 | Twombly | 261—79.1 X |
| 2,259,034 | 10/1941 | Fisher | 55—238 |
| 2,575,359 | 11/1951 | Ortgies | 55—238 X |
| 2,881,858 | 4/1959 | Krantz et al. | 55—238 |
| 3,186,146 | 6/1965 | Latham | 261—79.1 X |

HARRY B. THORNTON, *Primary Examiner.*

RONALD R. WEAVER, *Assistant Examiner.*